US006963578B2

(12) United States Patent
Akahane et al.

(10) Patent No.: US 6,963,578 B2
(45) Date of Patent: Nov. 8, 2005

(54) ROUTER

(75) Inventors: Shinichi Akahane, Tokyo (JP); Takeshi Aimoto, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 922 days.

(21) Appl. No.: 09/917,765

(22) Filed: Jul. 31, 2001

(65) Prior Publication Data

US 2002/0141403 A1 Oct. 3, 2002

(30) Foreign Application Priority Data

Mar. 30, 2001 (JP) ...................................... P2001-097965

(51) Int. Cl.[7] .......................... H04L 12/28; H04L 12/56
(52) U.S. Cl. ..................... 370/417; 370/429; 370/468; 370/219; 370/389
(58) Field of Search .................... 370/389, 230.1, 370/235, 412, 413, 417, 219, 220, 225, 227, 228, 237, 429, 468, 351, 355, 356, 360

(56) References Cited

U.S. PATENT DOCUMENTS

| | | | | |
|---|---|---|---|---|
| 6,205,150 | B1 | * | 3/2001 | Ruszczyk .................... 370/412 |
| 6,304,578 | B1 | * | 10/2001 | Fluss .......................... 370/413 |
| 6,798,743 | B1 | * | 9/2004 | Ma et al. ..................... 370/235 |
| 2002/0003795 | A1 | * | 1/2002 | Oskouy et al. ............. 370/389 |
| 2002/0093910 | A1 | * | 7/2002 | Yazaki et al. ............... 370/229 |

OTHER PUBLICATIONS

J. Moy, OSPF Version 2, Network Working Group, Ascend Communications, Inc (Apr. 1998) pp 1–5, 26, 161–168, 178, 182.

D. Thaler, C. Hopps, Multipath Issues in Unicast and Multicast Next–Hop Selection, Network Working Group, Microsoft, NextHop Technologies (Nov. 2000) pp 1–9.

D. Thaler, C. Hopps, Multipath Issues in Unicast and Multicast Next–Hop Selection, Internet Engineering Task Force, Microsoft, Merit Network (Feb. 2000) pp 1–9.

* cited by examiner

Primary Examiner—Ajit Patel
Assistant Examiner—Chirag Shah
(74) Attorney, Agent, or Firm—Reed Smith LLP; Stanley P. Fisher, Esq.; Juan Carlos A. Marquez, Esq.

(57) ABSTRACT

A router comprising a priority level distinguishing means for distinguishing the priority level of a packet by referring to the information contained in the header of the packet, a routing table where an output path comprising one or more output lines can be mapped to each level of priority, an output path determining unit that searches the routing table and determines an output path to be used for sending out packets, and a preferential delivery controller that executes delivery control in accordance with the priority level for each output line corresponding to the output path. In response to a fault state in a preferred output line, the router can reroute high priority packets over an alternative output line while maintaining priority. The router may also calculate a distribution ratio to determine the optimal load for each output line for a given packet priority.

20 Claims, 11 Drawing Sheets

FIG. 7

| FLOW CONDITION (LOOK-UP KEY) | | | | LOOK-UP RESULT |
|---|---|---|---|---|
| DESTINATION IP ADDRESS (DIP) | SOURCE PORT (SPORT) | DESTINATION PORT (DPORT) | THE OTHER HEADER INFORMATION | QOS INFORMATION |
| e | P0 | P1 | – | 1 |
| e | P2 | P3 | – | 3 |
| f | P0 | P1 | – | 2 |
| f | P2 | P3 | – | 3 |
| g | – | – | – | 3 |
| h | – | – | – | 3 |
| ⋮ | | | | ⋮ |

FIG. 8

| LOOK-UP KEY | | LOOK-UP RESULT |
|---|---|---|
| DESTINATION IP ADDRESS (DIP) | QOS INFORMATION | OUTPUT PATH IDENTIFIER |
| e | 1 | 1 |
| e | 3 | 3 |
| ⋮ | ⋮ | ⋮ |
| f | 2 | 2 |
| f | 3 | 3 |
| ⋮ | ⋮ | ⋮ |
| g | 3 | 3 |
| ⋮ | ⋮ | ⋮ |
| h | 3 | 3 |
| ⋮ | ⋮ | ⋮ |

FIG. 9

| | 900 LOOK-UP KEY | 901 LOOK-UP RESULT | | 902 | |
|---|---|---|---|---|---|
| | OUTPUT PATH IDENTIFIER | OUTPUT LINE NUMBER CANDIDATE | | DISTRIBUTION THRESHOLD | |
| | | CANDIDATE 1 | CANDIDATE 2 | CANDIDATE 1 | CANDIDATE 2 |
| ENTRY 911 | 1 | 1 | 1 | 127 | 255 |
| ENTRY 912 | 2 | 2 | 2 | 127 | 255 |
| ENTRY 913 | 3 | 1 | 2 | 63 | 255 |
| | ⋮ | ⋮ | | | |

ROUTER

This application claims priority to Japanese Patent Application No. P2001-097965.

BACKGROUND OF THE INVENTION

1. Field of the Invention

The present invention relates to routers for routing Internet Protocol (IP) packets and, more specifically, relates to routers and routing methods capable of transmitting packets according to a dynamic distribution ratio and responsive to a fault state in an output line.

2. Description of the Background

IP networks have gained explosive popularity in recent years, with the potential to substitute for telephone networks as one of the most important social infrastructures of society.

In order to reduce the cost of transmission line facilities, a procedure called Equal Cost Multipath is provided in an OSPF (Open Shortest Path First) protocol. The OSPF protocol increases the availability of the effective bandwidth allocated per virtual transmission channel by setting up redundant paths per channel, using a plurality of reduced cost lower-speed lines, and by distributing packets to the multiple lines. Descriptions of OSPF are given, for example, in RFC 2328.

In the OSPF procedure, if a plurality of paths exist and their costs (in terms of line speed, delay time, etc.) are equal when a router computes routing to a destination, the router sets these paths as the candidates for packet-forwarding paths in the routing table. If a plurality of packet-forwarding paths are set, when the router receives packets and determines a packet-forwarding path by searching the routing table, it selects one of the multiple paths according to a suitable distribution procedure. In this way, packets are load-distributed to a plurality of paths, and the multiple paths are regarded as one virtual transmission channel. Utilizing this method, an increase in the availability of effective transmission channel bandwidth can be realized with reduced cost.

Procedures for enabling a quick recovery from a network fault, for example, Automatic Protection Switch (APS), are known. In the APS, as the substitute for a normally operating communication path (working path), an additional communication path (backup path) is prepared in advance to be used in the event that a fault occurs in the working path. While the working path is normally used to forward data, in addition to the data forwarded by the working path, some data (referred to herein as "surplus data") can be forwarded by using the backup path. When a fault occurs, path switchover is performed in order to use the backup path to forward data that has been forwarded by the working path. Because of the backup path setup in advance and the definite correspondence between the working and backup paths, switchover processing in the event of a fault occurring is simple, and rapid path switchover can be performed.

In the Equal Cost Multipath procedure, a packet-distributing procedure is determined (whether or not the packets are distributed to multiple paths, the number of paths to be used for distributing the packets, and others) in accordance with the destination of the packets, but distributing packets in accordance with their priority cannot be performed.

On the other hand, in the APS, no consideration is given to the protection of high-priority packets at the switchover from the working path to the backup path.

SUMMARY OF THE INVENTION

In at least one preferred embodiment of a router according to the present invention, the router sends out high-priority packets with a first destination address specified in their header part over a first output line and high-priority packets with a second destination address specified in their header part over a second output line. The router preferably distributes low-priority packets between the first and second output lines at a distribution ratio that is determined depending on the redundant bandwidth of the first output line and the redundant bandwidth of the second output line.

In another embodiment of the router of the present invention, the router is provided with a first queue for queuing high-priority packets (a first string of packets) with a first destination address specified in their header part, a second queue for queuing low-priority packets (a second string of packets), a third queue for queuing the first string of packets, a fourth queue for queuing high-priority packets (a third string of packets) with a second destination address specified in their header part, a fifth queue for queuing the second string of packets, a first packet delivery controller that reads packets from the first and second queues and sends out the packets over a first output line, and a second packet delivery controller that reads packets from the third, fourth, and fifth queues and sends out the packets over a second output line.

The first packet delivery controller preferably reads the first string of packets from the first queue in preference to (giving preference over) reading the second string of packets from the second queue. The second packet delivery controller reads the first string of packets from the third queue and the third string of packets from the fourth queue in preference to reading the second string of packets from the fifth queue. When the first output line operates free from fault, the packet distribution processing unit determines to send out the first string of packets over the first output line, and the first string of packets are queued in the first queue. At the same time, the packet distribution processing unit preferably determines to send out the third string of packets over the second output line, and the third string of packets are queued in the fourth queue.

If a fault occurs in the first output line thereby placing the first output line in the fault state, the packet distribution processing unit preferably determines to send out the first string of packets over the second output line, and the first string of packets are queued in the third queue. At the same time, the packet distribution processing unit determines to send out the third string of packets over the second output line, and the third string of packets are queued in the fourth queue.

These and other potential objects, features and advantages of the present invention will appear more fully from the following detailed description of the invention, the drawings, and the attached claims.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 7 details a flow table containing exemplary entries;

FIG. 8 details a routing table containing exemplary entries;

FIG. 9 details a packet distribution table containing exemplary entries;

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided hereinbelow with reference to the attached drawings.

Before explaining the preferred embodiments of the router of the present invention, an example of the format of an IP packet coming into the router and an example of the internal packet format that is used inside the router are explained with reference to FIG. 2 and FIG. 3.

Figure 2:
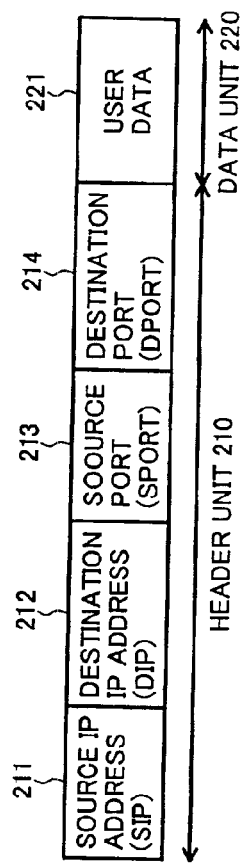
FIG. 2 is an illustration representing an example of the format of a packet to pass across an IP network.

FIG. 2 outlines the IP packet format. An IP packet consists of a header part 210 and a data part 220. The header part 210 is comprised of a source IP address 211 ("SIP") that is the IP address of a source or sending terminal, a destination IP address 212 ("DIP") that is the IP address of a destination or receiving terminal, a source port 213 ("SPORT") that represents a protocol (upper application) used on the source, and a destination port 214 ("DPORT") that represents a protocol used on the destination. In addition to the above information, information such as a service identifier (type of service: TOS) may also be stored in the header part 210. The data part 220 contains user data 221.

Figure 3:
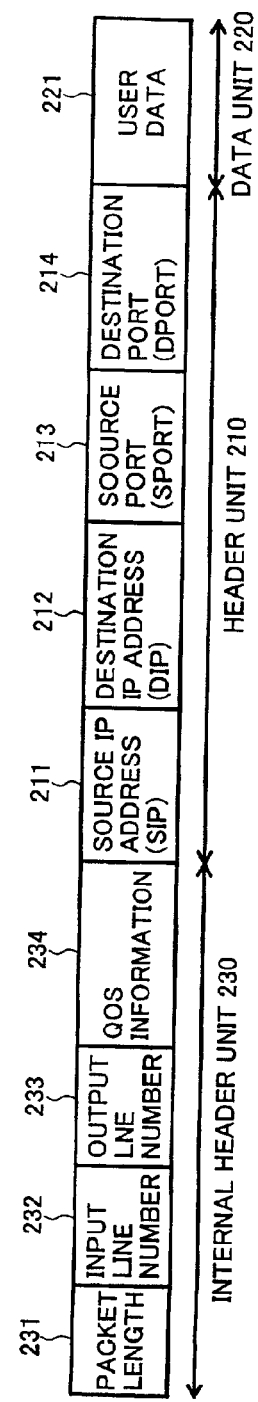
FIG. 3 is an illustration representing an example of the packet format that is used inside a router of the present invention.

FIG. 3 exemplifies the internal packet format. The internal packet consists of the IP packet shown in FIG. 2 and an internal header part 230 added to the packet. In this exemplary format, the internal header part 230 is comprised of packet length 231 that indicates the length of the packet in bytes, an input line number 232 that is the identifier of an input line through which the router received the packet, an output line number 233 that is the identifier of an output line over which the router will send out the packet, and QoS information 234 that indicates the priority of the packet.

A preferred embodiment of the router of the present invention will now be described below with reference to FIG. 1. A router 100 preferably comprises packet receiving units 120-$i$ (where i=1 to N) that receive packets carried in through one of input lines 110-$i$ (where i=1 to N), and a packet forwarding unit 130 The router 100 may also include a routing processing unit 600 that determines an output line upon which to send out a packet, a switch 140 that performs packet switching, queuing units 500-$j$ (where j=1 to N) that queue packets to an output line, packet transmitting units 150-$j$ that transmit packets over one of the output lines 160-$j$, and a controller 170 that executes overall router control and routing. The controller 170 also preferably sets a value in the tables in the routing processing unit 600 and monitors packet passage/discard counters in the queuing units 500-$j$.

When one of the packet receiving circuits 120-$i$ receives an IP packet through the input line 110-$i$ terminated thereto, it adds the internal header 230 to the received IP packet. The packet receiving unit 120-$i$ counts the length in bytes of the received IP packet and stores the count value (in units of bytes) into the packet length field 231 of the internal header 230. The packet receiving unit 120-$i$ stores the line number (i) of the input line 110-$i$ through which the packet was received in the input line field 232 of the internal header 230 and delivers the packet to the packet forwarding unit 130. At this time, the output line number 233 field contains a dummy value (the output line has not been determined yet).

When the packet forwarding unit 130 receives the packet including the header part 210, the data part 220, and the internal header part 230, the forwarding unit 130 extracts the header information 210 and the internal header information 230, and delivers this information to the routing processing unit 600. Using this header information 210 and internal header information 230, the routing processing unit 600 executes flow detection and routing table look-up and determines packet distribution. Then, the routing processing unit 600 determines the priority of the packet and an output line over which to send out the packet. The routing processing unit 600 then preferably notifies the packet forwarding unit 130 of the output line (for example, 160-$j$) and the QoS information indicating the priority of the packet. The configuration and operation of the routing processing unit 600 will be described in greater detail below.

The packet forwarding unit 130 stores the line number (j) of the output line 160-$j$ in the output line number field 233 and stores the QoS information in the QoS information field 234 of the internal header 230. The unit 130 then delivers the packet to the switch 140.

In accordance with the output line number 233, the switch 140 switches the packet to the appropriate path and delivers the packet to the corresponding queuing unit 500-$j$ as per the intended output line. The queuing unit 500-$j$ executes transmission control suitable for the priority of the packet according to the QoS information 234 and delivers the packet to the corresponding packet transmitting unit 150-$j$. Upon receiving the packet, the packet transmitting unit 150-$j$ removes the internal header part 230 from the packet and delivers the packet to the corresponding output line 160-$j$.

Figure 5:
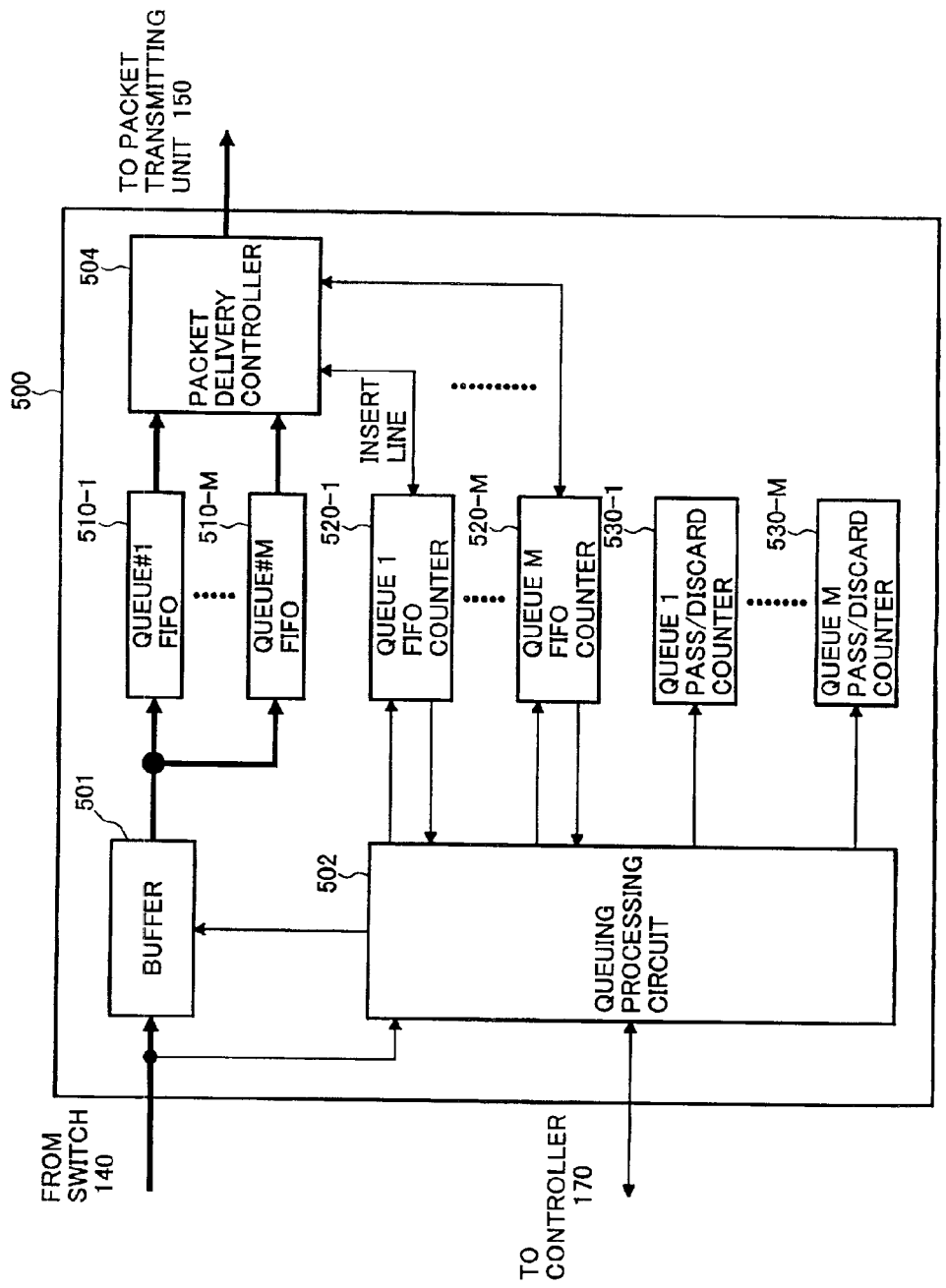
FIG. 5 shows an exemplary configuration of a queuing unit.

The operation of a queuing unit 500-$j$ will now be explained. FIG. 5 shows an exemplary configuration of the queuing unit 500. The queuing unit 500 is comprised of a buffer 501 for packet buffering, FIFO packet queues 510-$k$ (where k=1 to M) provided for a plurality of priority levels, and a queuing processing circuit 502 that controls the placement of packets into the FIFO packet queues 510-$k$ and packet discard.

The queuing unit 500 preferably also includes a packet delivery controller 504 that controls the transmission of the packets placed in the FIFO packet queues 510-$k$ in accordance with an agreement (e.g., a contract) made for each priority level of packets. The unit 500 may also include FIFO counters 520-$k$ that count the number of packets placed in the FIFO packet queues 510-$k$ and passage/discard counters 530-$k$ that count the number and byte size of queued packets and the number and byte size of discarded packets for the packets queued and discarded under the control of the queuing processing circuit 502.

When the queuing processing unit 502 receives a packet from the switch 140, the header part 210, the data part 220 and the internal header part 230 of the packet are all preferably stored into the buffer 501, and the internal header 230 is additionally stored in the queuing processing circuit 502. The queuing processing circuit 502 selects a FIFO packet queue (for example, 510-$k$) into which the packet is to be queued according to the QoS information 234 of the internal header part 230. Then, the queuing processing circuit 502 reads the value of the FIFO counter 520-$k$ corresponding to the selected FIFO packet queue 510-$k$ and determines to "place the packet into the queue" if the following inequality is true:

"the maximum number of packets to be placed in the FIFO packet queue 510-$k$">"the value of the FIFO counter 520-$k$."

In this case, the queuing processing circuit 502 requests the buffer 501 to deliver the packet to the FIFO packet queue 510-$k$, increments by "1" the read value of the FIFO counter 520-$k$, and stores this incremented value into the FIFO counter 520. Then, the queuing processing circuit 502 increments by "1" the number of passed packets and adds the byte count contained in the packet length 231 field of the internal header 230 to the number of bytes of passed packets in the appropriate passage/discard counter 530-$k$.

On the other hand, the queuing processing circuit 502 determines to "discard the packet" if the following equation is satisfied:

"the maximum number of packets to be placed in the FIFO packet queue 510-$k$"≦"the value of the FIFO counter 520-$k$."

In this case, the queuing processing circuit 502 does not request the buffer 501 to deliver the packet. The buffer 501 overwrites the information for the packet determined to be "discarded" with the information of the next packet to arrive. The queuing processing circuit 502 also does not increment the FIFO counter 520-$k$. Instead, the queuing processing circuit 502 increments by "1" the number of discarded packets and adds the byte count contained in the packet length 231 field of the internal header 230 to the number of the bytes of the discarded packets in the appropriate passage/discard counter 530-$k$.

In accordance with the agreement made for each priority level of packets, the packet delivery controller 504 preferably reads a packet from one of the FIFO packet queues 510-$k$ provided for the priority levels and delivers it to the associated packet transmitting unit 150. For example, the packet delivery controller reads a packet from a high-priority packet queue and delivers it to the packet transmitting unit so that its transmission within the agreement bandwidth will be ensured. When sending out a low-priority packet, the packet delivery controller 504 preferably reads a packet from a low-priority packet queue at such timing so as not to interrupt the transmission of a high-priority packet. When a packet is read from a FIFO packet queue 510-$k$, the value of the FIFO counter 520-$k$ corresponding to the FIFO packet queue 510-$k$ is decremented by "1" and stored into the counter 520-$k$ again.

The controller 170 may periodically monitor the passage/discard counters 530-$k$ provided for each of the queues 510-$k$ and may calculate the bandwidth for passage packets and the bandwidth for discard packets for each queue. For example, the bandwidth may be calculated by monitoring the byte size over a given period of time and dividing the byte size by the time to get the bandwidth.

Figure 1:
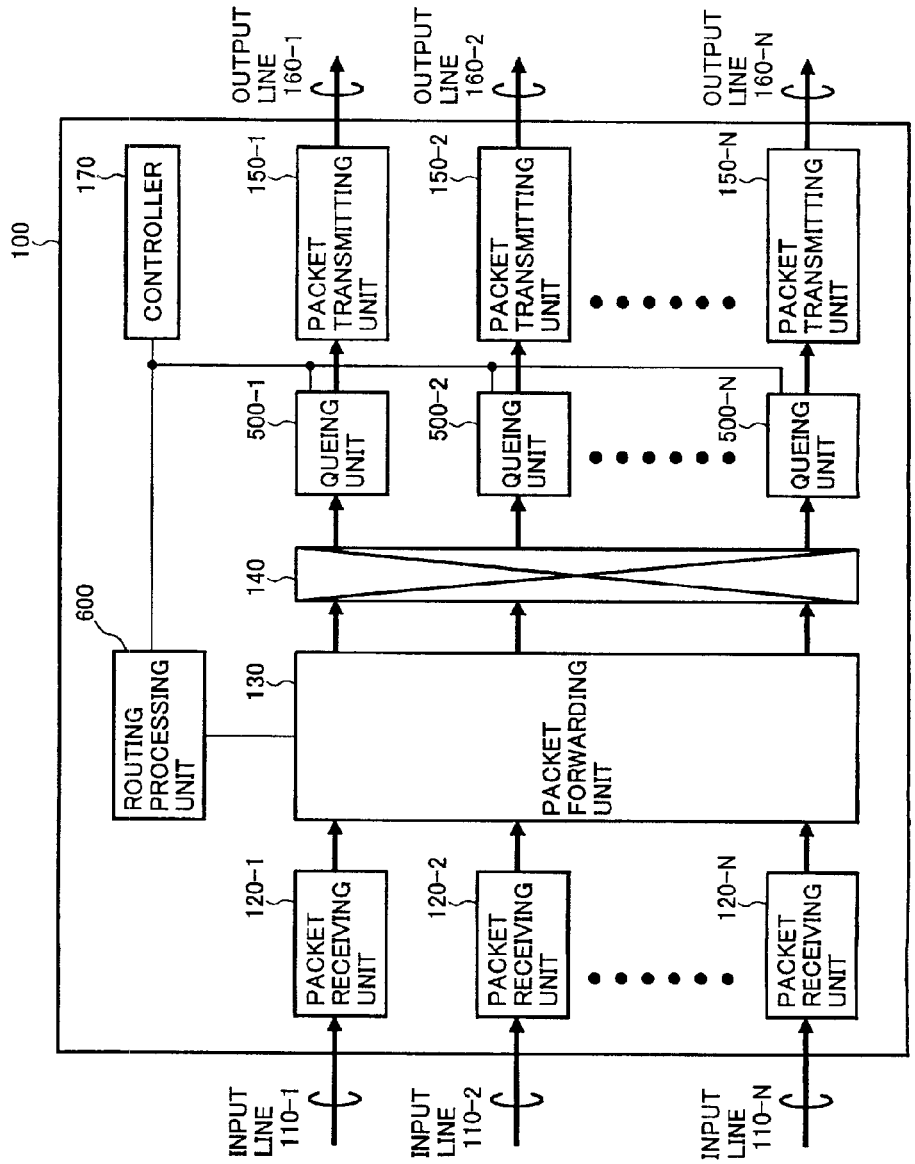
FIG. 1 shows an exemplary configuration of a router of the present invention.
Figure 4:
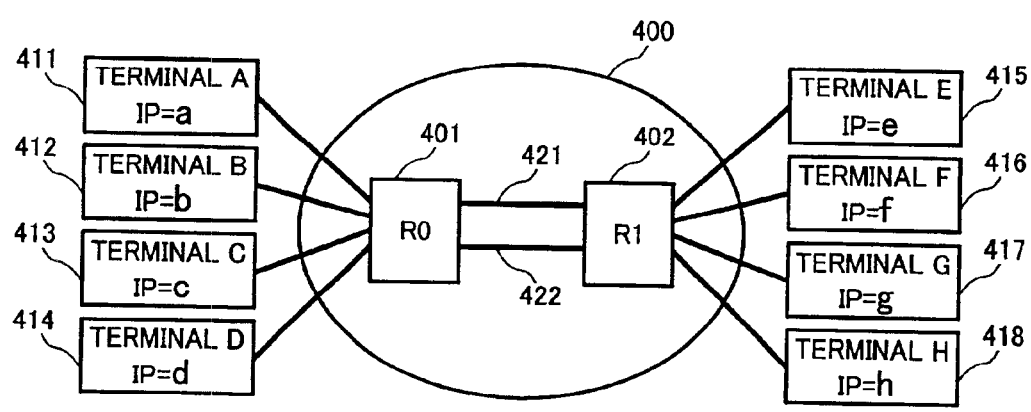
FIG. 4 shows a network topology to which a router of the present invention is applied.

FIG. 4 shows an exemplary network topology formed by using two units of the router 100 shown in FIG. 1. An IP network 400 comprises routers 401 and 402 that have the same configuration as the router 100 shown in FIG. 1. In the present network topology, only two routers are shown for simplifying the explanation, but any number of routers may exist in a system.

The router 401 is connected to terminal A 411, terminal B 412, terminal C 413, and terminal D 414. The router 402 is connected to terminal E 415, terminal F 416, terminal G 417, and terminal H 418. The router 401 and the router 402 are interconnected with two lines 421 and 422. The line 421 and the line 422 are capable of backing up each other in a redundant configuration. In the event that one line becomes inoperative in a fault state, both the router 401 and the router 402 send all packets over the other line, including those intended to be transmitted over the inoperative (fault) line. During normal operation, the routers preferably distribute packets between these two lines for effective use of bandwidth.

For purposes of example, it is assumed that the users E and F of the terminal E 415 and the terminal F 416 made an agreement with the carrier to use the IP network 400 for packet transfer in accordance with a priority predetermined per application. The agreement preferably includes the following general guidelines. For example, real-time processing communication packets are given high priority, and it is ensured that they are preferentially transferred (i.e., transferred before lower priority packets) by using a fixed bandwidth. On the other hand, web data and E-mail data packets are handled as low-priority packets and are transmitted in a low-priority transfer manner. It may also be assumed that the users G and H of the terminal G 417 and the terminal H 418 have agreed with the carrier to use the IP network 400 with agreement terms in which all packets are transferred as low-priority packets.

Packets transmitted from any of terminal A 411, terminal B 412, terminal C 413, and terminal D 414 are carried through the routers 401 and 402 and arrive at any of terminal E 415, terminal F 416, terminal G 417, and terminal H 418. The router 401 is set to forward high-priority packets whose destination is the terminal E 415 over the line 421 and high-priority packets whose destination is the terminal F 416 over the line 422. The router 401 is also set to forward all packets (low-priority packets) whose destination is the terminal G 417 or the terminal H 418 by distributing them between the line 421 and the line 422. The ratio setting of this distribution between both lines are preferably changed periodically so that unoccupied bandwidth of the lines 421 and 422 can be used more efficiently. The setting of this distribution ratio will be described below.

Figure 6:
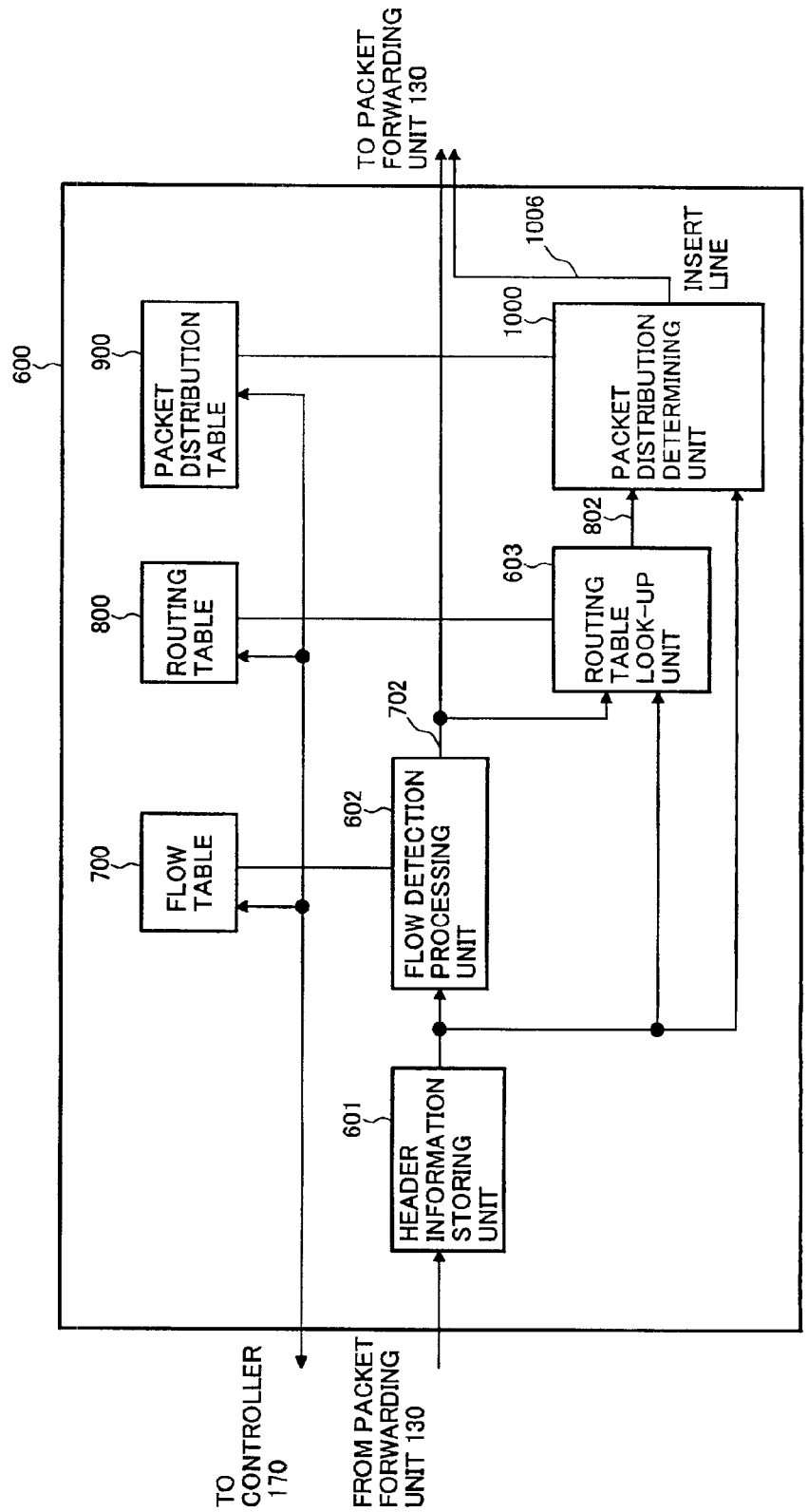
FIG. 6 shows an exemplary configuration of a routing processing unit.

By referring to FIGS. 6 through 10, the operation of the routing processing unit 600 will now be described. FIG. 6 shows an exemplary configuration of the routing processing unit 600. The routing processing unit 600 is preferably comprised of a header information storing unit 601, a flow table 700, a flow detection processing unit 602 that looks up a flow in the flow table 700, a routing table 800, a routing table look-up processing unit 603 that looks up routing information in the routing table 800, a packet distribution table 900, and a packet distribution determining unit 1000 that determines an output line number 1006 by searching the packet distribution table 900. The header information storing unit 601 stores the header part 210 and the internal header part 230 of a packet received from the packet forwarding unit 130.

FIG. 7 exemplifies the structure of a flow table 700. The flow table 700 contains the flow condition entries 701 for identifying the attribute of a packet transferred from a user to another user, a packet attribute being assigned a priority level that is predetermined in accordance with the agreement between the carrier and an individual user, and the QoS information entries 702 indicating the priority associated with the flow condition 701 entries. Herein, the conditions for identifying the attribute of a packet, comprising possible combinations of the information items specified in the header, are called flow conditions.

A series of packets that meet any flow conditions is called a flow. A process consisting of identifying a flow to which an input packet belongs by determining what conditions are fulfilled by the information in the header of the packet and identifying a priority level predetermined for the flow is called flow detection. A non-entry marking "-" in the flow condition 701 fields in FIG. 7 denotes that these fields may contain any value. Although the "other header information" fields contain the "-" marking and therefore no setting for one of the flow conditions, all of the flow conditions may be set, including "other header information."

FIG. 8 exemplifies the structure of a routing table 800. The routing table 800 preferably contains the output path identifier entries 802 that correspond to the DIP entries and the entries of the above-mentioned QoS information 702. Herein, the output path identifier 802 is used as the identifier indicating a group comprising a plurality of output line candidates.

FIG. 9 exemplifies the structure of a packet distribution table 900. The packet distribution table 900 preferably contains the above-mentioned output path identifier entries 802, their associated entries of a plurality of output line number candidates 901, and the distribution threshold entries 902 that correspond to the output line number candidates 901. The distribution threshold will be described below. Although, in the example of FIG. 9, two output line candidates are specified for the entries 911 to 913, the number of the output line candidates may also be greater or less than two and may be variable for each entry.

Figure 10:
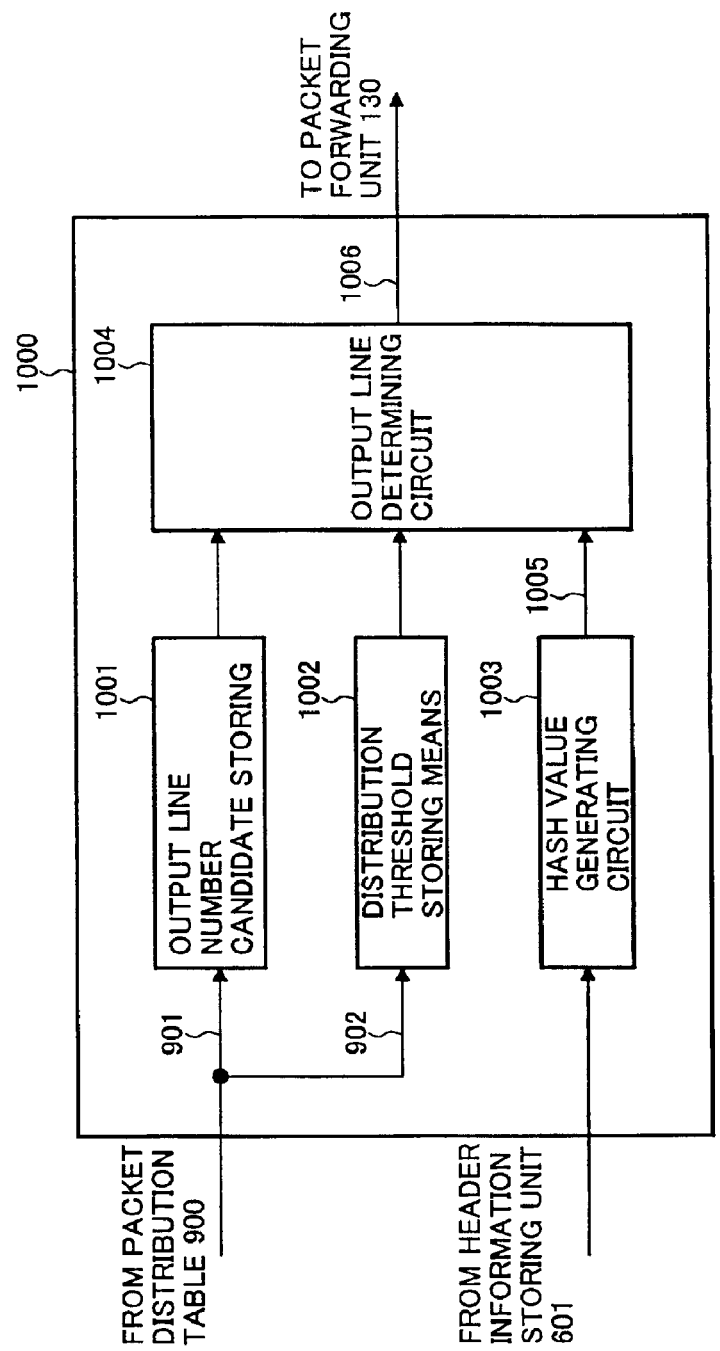
FIG. 10 shows an exemplary configuration of a packet distribution determining unit.

FIG. 10 shows an exemplary configuration of a packet distribution determining unit 1000. Packet distribution procedures that may be implemented by the packet distribution determining unit 1000 are described in, for example, the request for comment RFC2991 from IETF. A Hash-Threshold procedure, one of the packet distribution procedures described in the above request for comment documentation, is applied.

This Hash-Threshold procedure calculates a hash value from, for example, the SIP and DIP of a received packet and distributes the packet based on this hash value. The use of this procedure preferably ensures that packets having the same SIP and DIP are routed on the same path. Therefore, the packets in the same flow will preferably arrive at the receiving terminal in the sequence in which they have been sent out. If another distribution procedure is used that does not ensure that the packets arrive in sequence, the packets received at the receiving terminal may need to be rearranged into the proper sequence or a TCP retransmission may occur thereby decreasing the packet transmission bandwidth.

The packet distribution determining unit 1000 is preferably comprised of an output line number candidate storing means 1001, a distribution thresholds storing means 1002, a hash value generating circuit 1003, and an output line determining circuit 1004. The output line number candidates storing means 1001 stores a plurality of output line number candidates 901 which are obtained as the result of searching the packet distribution table 900. The distribution thresholds storing means 1002 stores distribution thresholds 902 which are also obtained as the result of searching the packet distribution table 900. The hash value generating circuit 1003 generates a hash value 1005 from, for example, the SIP 211 and DIP 213 in the header part 210 which is stored in the header information storing unit 601. Hash values thus generated are, for example, 8-bit values (0 to 255).

The space equivalent to the bandwidth of a virtual transmission channel consisting of a plurality of output lines is evenly partitioned in units of these hash values. The distribution thresholds 902 are used to divide this space and allocate each space division to each output line candidate. This allocation is explained using the entry 913 in FIG. 9 as an example. One space division with hash values 0 to 63 is allocated to line 1 that is output line candidate 1, and the remaining space division with hash values 64 to 255 is allocated to line 2 that is output line candidate 2. In this example, the above space is allocated between line 1 and line 2 at a ratio of 1:3 in size.

Out of the plurality of space divisions, each allocated to one of the output line candidates according to the distribution thresholds 902, the output line determining circuit 1004 determines which is the space division having a predetermined hash value range within which the generated hash value 1005 falls. Then, this circuit 1004 outputs an output line number 1006 to which the determined space division is allocated as the result of the output line determination.

If there are a great number of combinations of source terminals and destination terminals (that is, SIP and DIP combinations) of packets to be handled by the router 100, it can be expected that hash values generated from the SIPs and DIPs are evenly distributed throughout the space partitioned in units of hash values. Thus, the packet distribution ratio can be expected to approximate the ratio of size between the space divisions divided, according to the distribution thresholds 902. For example, packets to be routed as in the entry 913 can be distributed between line 1 and line 2 at a ratio of approximately 1:3.

While the configuration of the packet distribution determining unit 1000 for implementing the Hash-Threshold procedure was explained above with reference to FIG. 10, other configurations are also possible. For example, this unit 1000 can be made to operate as follows. The unit 1000 may first read only the distribution thresholds 902 from the packet distribution table 900 and then determine an output line candidate based on the distribution thresholds 902 and the hash value 1005. Finally, the unit 1000 may read only the output line number of the determined candidate line from the packet distribution table 900. In this case, the output line number candidate storing means 1001 shown in FIG. 10 need not have as many units of storage as the number of candidates. For example, the storage means 1001 may have one unit of storage space (for storing the determined output line number). Thus, the number of units of storage may be reduced.

While the configuration of the packet distribution determining unit 1000 for implementing the Hash-Threshold procedure was explained above with reference to FIG. 9 and FIG. 10, it may be possible to implement another distribution procedure. Furthermore, it may be possible to install the hardware configurations for implementing a plurality of packet distribution procedures together and carry out a different packet distribution procedure that is suitable for making routing decisions based on priority, DIP, or priority and DIP in combination.

The operation of the routing processing unit 600 will now be described (see FIG. 6). Initially, the flow detection processing unit 602 searches the flow table 700 for a match with the search key of information required for flow detection retrieved from the information stored in the header information storing unit 601. QoS information 702 indicating a priority level matching with the search key, obtained as the result of search, is preferably delivered to the packet forwarding unit 130 and the routing table look-up processing unit 603.

Thereafter, the routing table look-up processing unit 603 searches the routing table 800 for a match with the search key consisting of the QoS information 702 and the DIP 212 retrieved from the information stored in the header information storing unit 601. An output path identifier 802 matching the search key obtained as the result of the search is preferably delivered to the packet distribution determining unit 1000. Then, the packet distribution determining unit 1000 searches the packet distribution table 900 for a match with the search key that is the output path identifier 802.

A plurality of output line candidates 901 obtained as the result of search are stored in the output line number candidates storing means 1001, and the distribution thresholds 902 predetermined for the output line number candidates are stored by the distribution threshold storing means 1002 (see FIG. 10). At the same time, the hash value generating circuit 1003 generates a hash value 1005 from the combination of appropriate information items in the header 210, stored in the header information storing unit 601, and delivers it to the output line determining circuit 1004. Based on the hash value 1005 and the distribution thresholds 902, the output line determining circuit 1004 determines an output line number 1006 and delivers it to the packet forwarding unit 130.

As described above, the router 100 executes flow detection, determines the level of priority of the received packets, searches the routing table for a match with the search key consisting of the priority level (QoS information) and DIP, and executes packet distribution. Thus, even for multiple packets whose destination is the same terminal, the router can perform the distribution of individual packets according to the priority.

While the routing table 800 and the packet distribution table 900 are separate in the configuration shown in FIG. 6, it is possible to integrate these tables into one combined table. That is, it is possible to expand the routing table 800 to include the settings of the output line number candidates 901 and the distribution thresholds 902 which are the look-up results of the packet distribution table 900, instead of the output path identifiers which are the look-up results of the routing table 800.

In FIG. 6, the sequential processing of flow detection, routing table search, and packet distribution determination may all be executed using pipelines for high-speed processing.

Figure 11:
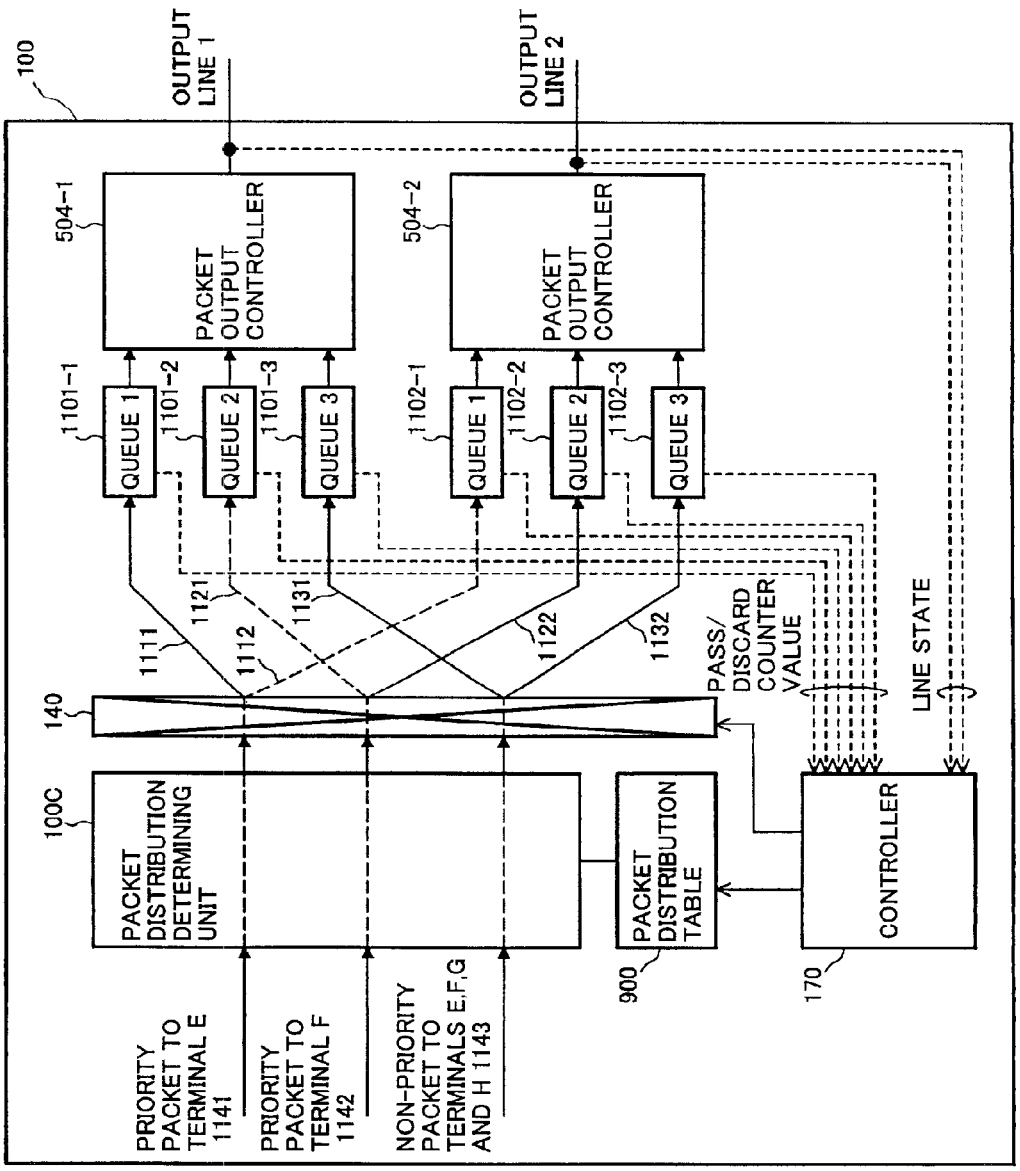
FIG. 11 details a system for adjusting the distribution ratio of low-priority packets and protecting high-priority packets at the switchover between the output lines due to the fault of a line.

With reference to FIG. 11, a method of adjusting the distribution ratio of low-priority packets and of protecting high-priority packets at the switchover between the output lines due to a fault in a line will now be explained.

FIG. 11 schematically displays the process by which the router 100 preferably handles packets. Specifically, it shows how the router determines the level of priority and path identifier of the packets by flow detection and a search of the routing table, and it shows how the packets are placed in the queues separately provided for different output lines. Some components of the router 100 that do not relate to the following explanation are omitted from this schematic drawing.

For simplification, the FIFO counters corresponding to the queues 1101-1 to 1101-3 and 1102-1 to 1102-3 are also omitted from this schematic drawing, and the controller 160 appears to read the values of the passage/discard counters directly from the queues. Furthermore, the controller 170 appears to be notified of the line states (indicating whether a line fault occurs) of output line 1 and output line 2 directly from the lines in this drawing.

In FIG. 11, high-priority packets to terminal E 1141, high-priority packets to terminal F 1142, and low-priority packets to terminals E, F, G, and H are routed in accordance with the assumed agreements as explained with respect to FIG. 4. As the result of flow detection and routing table search, it is determined that the QoS information is "1" and the path identifier is "1" for routing the high-priority packets to terminal E 1141. Similarly, it is determined that the QoS information is "2" and the path identifier is "2" for routing the high-priority packets to terminal F 1142. Similarly, it is determined that the QoS information is "3" and the path identifier is "3" for routing the low-priority packets to terminal E, F, G, and H 1143. Such determinations depend on the settings in the flow table exemplified in FIG. 7 and the settings in the routing table exemplified in FIG. 8. The QoS information is specified for each of the queues for each output line.

The packet distribution table 900 preferably contains the settings as exemplified in FIG. 9. Output line 1 is assigned to the output path identifier "1." Output line 2 is assigned to the output path identifier "2." Two output lines 1 and 2 are assigned to the output path identifier "3."

The router 100 preferably includes the queues for output line 1: queue 1101-1 for storing high-priority packets to terminal E 1141; queue 1101-2 for storing high-priority packets to terminal F 1142; and queue 1101-3 for storing low-priority packets to terminals E, F, G, and H 1143. The same priority is given to the queue 1101-1 and the queue 1101-2. Among these queues, the queue 1101-2 is to store high-priority packets to terminal F 1142 in the event that a fault in the output line 2 occurs, but no packets are queued in this queue 1102-2 during normal operation.

In addition, the router 100 preferably includes the queues for output line 2: queue 1102-1 for storing high-priority packets to terminal E 1141; queue 1102-2 for storing high-priority packets to terminal F 1142; and queue 1102-3 for storing low-priority packets to terminals E, F, G, and H 1143. The same priority is given to the queue 1102-1 and the queue 1102-2. Among these queues, the queue 1102-1 is to store high-priority packets to terminal E 1141 in the event that a fault in the output line 1 occurs, but no packets are queued in this queue 1102-1 during normal operation.

The packet delivery controller 504-1 for output line 1 holds the agreement bandwidth settings for the packets in the queue 1101-1 and the packets in the queue 1101-2 to assure that the packets from each queue are transmitted within each agreement bandwidth. Thus, the packet delivery controller 504-1 delivers the packets to the output line 1 in accordance with the agreement bandwidth for transmitting the packets. If it is assumed that the agreement bandwidth setting for the packets in the queue 1101-1 is BW1, that for the packets in the queue 1101-2 is BW2, and the bandwidth allocated for the output line 1 is CW1; the following constraint shall be fulfilled:

$$CW1 \geq BW1+BW2 \qquad \text{(Inequality Constraint 1)}$$

Similarly, the packet delivery controller 504-2 for output line 2 holds inside agreement bandwidth settings BW1 and BW2, respectively for the packets in the queue 1102-1 and the packets in the queue 1102-2. If the bandwidth allocated for the output line 2 is assumed CW2, the following constraint shall be fulfilled:

$$CW2 \geq BW1+BW2$$

The handling of the packets in the router during normal operation will now be explained. High-priority packets to terminal E 1141 are queued into the queue 1101-1 for output line 1, which is provided to store packets assigned "1" as QoS information in accordance with the settings in the flow table 700, the routing table 800, and the packet distribution table 900. The path is denoted by a solid line 111 in FIG. 11. High-priority packets to terminal F 1142 are queued into the queue 1102-2 for output line 2, which is provided to store packets assigned "2" as QoS information, which is similarly denoted by a solid line 1122.

For low-priority packets to terminals E, F, G, and H 1143, there are two candidates of output lines 1 and 2 over which the packets may be forwarded. Thus, these packets are distributed to the output line 1 and the output line 2 as determined by the packet distribution determining unit 1000. These paths are denoted by solid lines 1131 and 1132 in FIG. 11. Because these packets are assigned "3" as QoS information, they are queued in queues 1101-3 and 1102-3 provided for storing them. The solid lines 1111 to 1132 are drawn to simply indicate the different queues to store the different destination packets.

The packet delivery controller 504-1 sends out the packets in queue 1101-1 preferentially over the output line 1 in accordance with the agreement bandwidth setting BW1 for user E. At the same time, the packet delivery controller 504-1 attempts to send out the packets in queue 1101-2 preferentially over the output line 1 in accordance with the agreement bandwidth setting BW2 for user F. However, because no packets are queued in the queue 1101-2 during normal operation, the packet delivery controller will normally execute no delivery control of the queue 1101-2.

Additionally, the packet delivery controller 504-1 sends out the packets in queue 1101-3 over the output line 1 to an extent beyond which sending these packets may affect the assured transmission of high-priority packets using the agreement bandwidth. The packet delivery controller 504-2 operates in the same way as above, and it will normally execute no delivery control of the queue 1102-1.

The setting of the ratio of distributing low-priority packets 1143 between the output lines will now be explained. High-priority packets 1141 are sent out over the output line 1 in accordance with the agreement bandwidth setting BW1, and high-priority packets 1142 are sent out over the output line 2 in accordance with the agreement bandwidth setting BW2. For simplification, it is assumed that the bandwidth settings BW1 and BW2 according to which the high-priority packets 1141 and 1142 are sent out, are fixed.

In this case, redundant bandwidth RW1 of output line 1 is obtained by RW1=CW1−BW1, and redundant bandwidth RW2 of output line 2 is obtained by RW2=CW2−BW2. If the average bandwidth used for incoming low-priority packets 1143 for a period is assumed to be BW3, an expected value DW3min for the total sum DW3 of the cuts of the bandwidth, equal to the quantity of discarded low-priority packets 1143 is obtained as follows:

$$DW3\text{min}=\max [BW3-(RW1+RW2), 0] \qquad \text{(Equation 2)}$$

If the distribution ratio is not good, the difference between DW3 and DW3 min becomes large. This difference is expressed as DDW3=DW3−DW3min. Thus, the distribution ratio should be adjusted so that the value of DDW3 will be minimized to maximize the use of the bandwidth.

For simplification, consider a case where the change of the average bandwidth used for the incoming packets is sufficiently slow as compared with the time of the intervals at which the values of the passage/discard counters of the queues are monitored. In this case, BW3 can be regarded as being approximately constant. Thus, DW3min can also be regarded as being constant.

Figure 12:
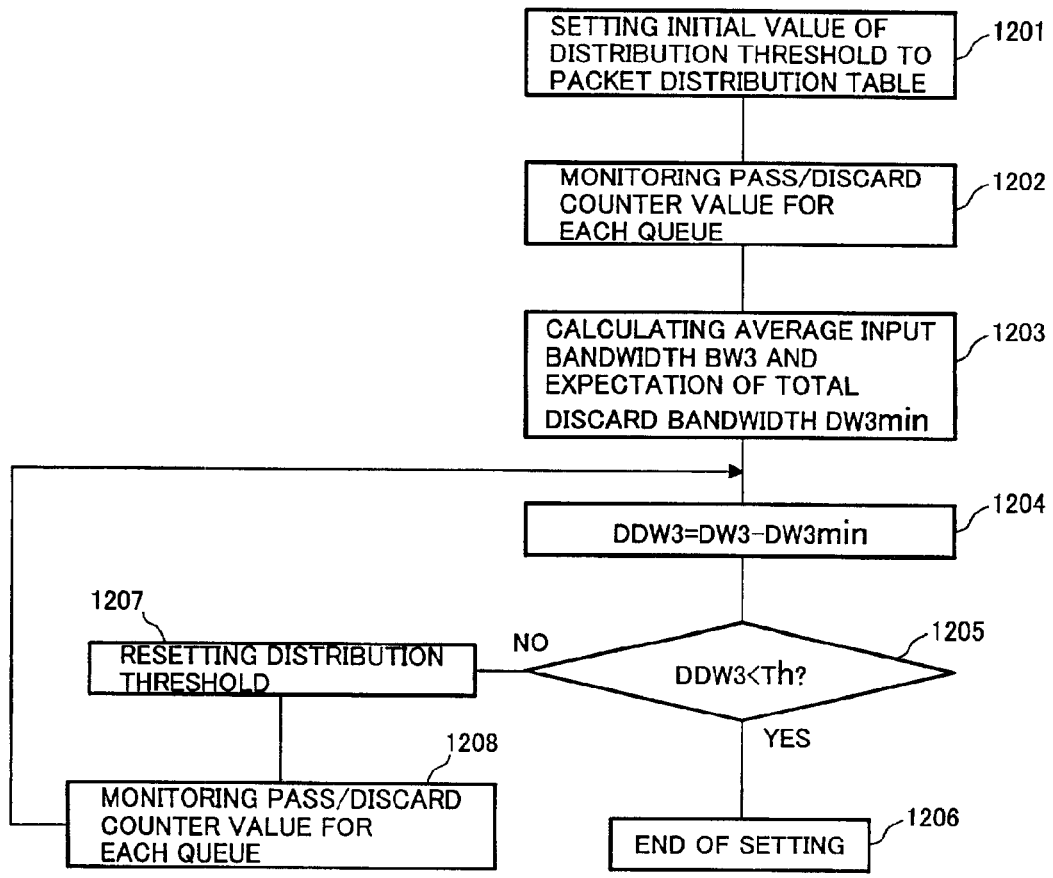
FIG. 12 is a flowchart illustrating a process for setting the distribution ratio.

The outline flow of the process of setting the distribution ratio on the conditions described above is illustrated in FIG. 12. The initial distribution ratio should be set at RW1:RW2. Set the distribution thresholds in the packet distribution table to attain this distribution ratio (step 1201). After the thresholds are set, the values of the passage/discard counters of the queues are monitored (step 1202). Average bandwidth BW3 used for incoming low-priority packets 1141 and an expected value DW3min for the total sum of bandwidth cuts equal to the quantity of discarded packets are calculated (step 1203).

The value of DDW3 is calculated from DW3 (step 1204). Then, a comparison is made between DDW3 and an evaluation threshold Th which is assumed to be set in advance (step 1205). If DDW3 is less than Th, the process of setting the distribution ratio terminates (go to step 1206). If DDW3 is greater than Th, the distribution ratio is preferably recalculated based on the bandwidth cuts equal to the quantity of discarded packets for the queues 1101-3 and 1102-3. The distribution thresholds to attain the calculated ratio are set in the packet distribution table (step 1207). The values of the passage/discard counters of the queues are monitored (step 1208), and a return is made to the step 204. The controller 170 preferably executes the above flow of setting the distribution ratio whereby low-priority packets 1143 can properly be distributed between the redundant bandwidths of the output lines.

High-priority packets 1141 and 1142 are sent out over a single output line; they are not distributed. Consider a presumptive case where high-priority packets 1141 and 1142 are distributed to the output line 1 and the output line 2, and the distribution ratio is altered as described above for low-priority packets in order to make effective use of the redundant bandwidths of the lines. In this case, the path of packets for which a hash value near the distribution thresholds is generated changes. Consequently, there is a possibility of the loss of the assurance that packets are received at the receiving terminal in the sequence in which they have been sent out and a possibility of the transmission bandwidth being restricted by TCP flow retransmission control activated. Thus, it is desirable that packet distribution is set to be disabled for high-priority packets for which strict requirements such as minimizing delay are specified.

In the above-described example, the case was discussed where the bandwidth to be used for sending out high-priority packets 1141 is fixed to BW1 and that for sending out high-priority packets 1142 is fixed to BW2. Even if the bandwidths for sending out the high-priority packets are not fixed (for example, in a case where complete priority control is executed for high-priority packets), however, the procedure of setting the distribution ratio illustrated in FIG. 12 may be applied as well. In this case, the redundant bandwidths R1 and R2 may vary dynamically. The bandwidths for sending out high-priority packets can be measured by monitoring the values of the passage counters of the queues where the high-priority packets are queued.

The handling of packets in the event that a fault occurs in the output line 2 will now be explained. When the controller 170 receives a notification that a fault occurs in output line 2, it preferably performs switchover from the line 2 to the other line 1 to send out all packets over the other output line 1 including those originally intended to be sent out over the output line 2. Although several methods of switchover between the lines are conceivable, a line switching procedure by changing the line settings in the switch 140 is applied herein.

The switch 140 preferably includes a table of mapping between the output line numbers 233, one of which is specified in the internal header part 230 of a packet, and the output lines over which packets are actually sent out. The controller 170 may be capable of changing the contents of this mapping table. Assume that, during normal operation, output line 1 and output line 2 are set mapped in the table to output line numbers 1 and 2, respectively,. When a fault in the output line 2 occurs and the controller 170 receives the notification thereof, the controller 170 checks the settings in the mapping table and changes the output line mapped to output line number 2 from the output line 2 to the output line 1. Due to this change, packets sent out over the output line 2 prior to the occurrence of the fault of the line will now be sent out over the output line 1.

After the line switchover processing is performed, high-priority packets to terminal F 1142 are queued in the queue 1101-2 for output line 1 as indicated by a broken line 1121 in FIG. 11. Low-priority packets to terminals E, F, G, and H are all queued in the queue 1101-3 for output line 1 as indicated by the solid line 1131. At this time, because the queue 1101-2 has been provided beforehand for high-priority packets to terminal F 1142, other high-priority packets such as those to terminal E 1141 in the present case are not affected by the line switchover.

The agreement bandwidth BW for user F has been set beforehand in the packet delivery controller 504-1, and the relationship between the bandwidth of the output line 1 and BW1 plus BW2 subject to the foregoing Inequality Constraint (1) is true. Thus, sending out both high-priority packets to terminal E 1141 and high-priority packets to terminal F 1142 is controlled with the assurance that they are transmitted within their agreement bandwidths.

In preparation for switching over from one line to the other, another queue for high-priority packets is provided for the other line, and the agreement bandwidth for the packets is also set in the delivery controller for the other line as explained above. In this way, a system that ensures that high-priority packets are transmitted within the agreement bandwidth after a line switchover due to the line fault can be implemented.

In the above explanation, two strings of high-priority packets 1141 and 1142 are set to be queued respectively in the priority packet queues 1101-1 and 1102-2 that are for different lines. However, the packet distribution table may be set so that these packets will be queued in the priority packet queues for the same line, for example, the queues 1101-1 and 1101-2 for output line 1. In this case, the queues 1102-1 and 1102-2 for output line 2 are to store two strings of high-priority packets 1141 and 1142 in the event that a fault occurs in output line 1.

By using the router of the present invention, individual packets can be distributed to at least two output lines. This distribution may or may not apply, depending on the priority level of packets. Therefore, it is feasible to distribute only low-priority packets and disable the distribution of high-priority packets. By adjusting the ratio of distributing low-priority packets between the lines, according to the use conditions of the bandwidths of the lines, effective use of the line bandwidths can be realized. Because packet distribution is not applied for high-priority packets, quality deterioration, e.g., out of sequence of the packets received, caused by path change due to the adjustment of the packet distribution ratio is substantially avoidable.

Furthermore, the router of the present invention preferably determines the priority level of packets on flow detection and queues packets it received into one of the multiple queues, some of which are for high-priority packets, for each line, in accordance with the priority level. Even if a fault in one line occurs, followed by switchover to the other output line to send all packets over the other line, high-priority packets are queued into the priority packet queue for the other output line after the switchover. Thus, it can be assured that high-priority packets are always preferentially sent out over one of the output lines.

The foregoing invention has been described in terms of preferred embodiments. However, those skilled, in the art will recognize that many variations of such embodiments exist. Such variations are intended to be within the scope of the present invention and the appended claims.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A router for routing packets, each packet consisting of a header part and a data part, in accordance with a destination address that is specified in said header part, comprising:

a priority level distinguishing means for distinguishing the priority level of a packet by referring to header information in the header of the packet;

a packet distribution processing unit for determining an output line to be used for sending out packets;

a first packet transmitting unit for sending out packets over a first output line; and a second packet transmitting unit for sending out packets over a second output line;

wherein said packet distribution processing unit determines to send out a first string of packets distinguished by said priority level distinguishing means as first-priority packets with a first destination address specified in their header part over said first output line, to send out a second string of packets distinguished as first-priority packets by said priority level distinguishing means with a second destination address specified in their header part over said second output line, and to distribute a third string of packets distinguished by said priority level distinguishing means as second-priority packets between said first output line and said second output line at a distribution ratio that is determined based on the redundant bandwidth of said first output line and the redundant bandwidth of said second output line.

2. The router as recited in claim 1, wherein said first-priority packets have a higher priority than said second priority packets.

3. The router as recited in claim 1, further comprising:
a switch for switching packets delivered from said packet distribution processing unit to one of said packet transmitting units determined by said packet distribution processing unit.

4. The router as recited in claim 1, wherein said distribution ratio is determined based on the calculated bandwidth of passed and discarded packets flowing through each of said output lines in a given period of time.

5. The router as recited in claim 1, wherein said packet distribution unit is further comprised of:
a hash value generator that generates a hash value based on information given in the header of a packet, wherein a first division of space is assigned to said first output line and a second division of space is assigned to said second output line, further wherein said hash value generator determines to send out said third string of packets over said first output line if the hash value generated by said hash value generator corresponds to the range of hash values assigned to the first division of space and said hash value generator determines to send out said third string of packets over said second output line if said hash value falls within the range of hash values assigned to the second division of said space, and further wherein a ratio between the size of said first division of space and the size of said second division of space is set in accordance with said distribution ratio.

6. The router as recited in claim 5, wherein said hash value is generated based on a combination of information given in the header part of a packet selected from the group consisting of a source address, a destination address, a source port, a destination port, a type of service, and combinations thereof.

7. The router as recited in claim 1, further comprising:
a means for observing the bandwidth used for said third string of incoming packets and determining said distribution ratio depending on the variation of the bandwidth used for said third string of incoming packets.

8. The router as recited in claim 6, further comprising:
a means for observing the bandwidth used for said third string of incoming packets and determining said distribution ratio depending on the variation of the bandwidth used for said third string of incoming packets.

9. The router as recited in claim 8, further comprising:
a first queue for queuing said third string of packets delivered from said switch and determined to be sent out over said first output line;
a second queue for queuing said third string of packets delivered from said switch and determined to be sent out over said second output line;
a first queuing control unit for determining whether said third string of packets are to be queued in said first queue or discarded without being queued in said first queue; and
a second queuing control unit for determining whether said third string of packets are to be queued in said second queue or discarded without being queued in said second queue.

10. The router as recited in claim 9, wherein said means for observing the bandwidth used for said third string of incoming packets comprises:
a first counter for counting the number of packets queued in said first queue and the number of bytes thereof as well as the number of packets discarded without being queued in said first queue and the number of bytes thereof; and
a second counter for counting the number of packets queued in said second queue and the number of bytes thereof as well as the number of packets discarded without being queued in said second queue and the number of bytes thereof.

11. The router as recited in claim 9, wherein said first and second queuing control units are one single combined queuing control unit.

12. The router as recited in claim 10, wherein said first and second counters are one single combined counter.

13. A router for routing packets, each packet consisting of a header part and a data part, in accordance with a destination address that is specified in said header part, comprising:
a priority level distinguishing means for distinguishing the priority level of a packet by referring to header information given in the header of the packet;
a packet distribution processing unit for determining an output line to be used for sending out packets;
a switch for switching packets delivered from said packet distribution processing unit to a path toward an output line determined by said packet distribution processing unit;
a first queue for queuing a first string of packets with a first destination address specified in their header part, distinguished as first-priority packets by said priority level distinguishing means delivered from said switch;
a second queue for queuing a second string of packets distinguished as second-priority packets by said priority level distinguishing means delivered from said switch;
a third queue for queuing said first string of packets delivered from said switch;
a fourth queue for queuing said second string of packets delivered from said switch;
a first packet delivery controller for reading packets from said first and second queues and for sending out the packets over a first output line; and
a second packet delivery controller for reading packets from said third and fourth queues and for sending out the packets over a second output line;
wherein said first packet delivery controller reads said first string of packets from said first queue in preference to reading said second string of packets from said second queue,
wherein said second packet delivery controller reads said first string of packets from said third queue in preference to reading said second string of packets from said fifth queue,
further wherein during normal operation said packet distribution processing unit determines to send out said first string of packets over said first output line via said first queue, and
further wherein during a fault state in said first output line said packet distribution processing unit determines to send out said first string of packets over said second output line via said third queue.

14. The router as recited in claim 13,
wherein during normal operation said packet distribution processing unit distributes said second string of packets between said first output line via said second queue and said second output line via said fourth queue at a distribution ratio that is determined based on the redundant bandwidth of said first output line and the redundant bandwidth of said second output line, and
further wherein during said fault state in said first output line said packet distribution processing unit determines to send out all of said second string of packets over said second output line via said fourth queue.

15. The router as recited in claim 14, wherein during said fault state, said first string of packets are given priority over said second string of packets over the second output line.

16. The router as recited in claim 13, wherein said packet distribution unit further comprises:
a hash value generator that generates a hash value based on information given in the header of a packet, wherein a first division of space is assigned to said first output line and a second division of space is assigned to said second output line, further wherein said hash value generator determines to send out said second string of packets over said first output line if the hash value generated by said hash value generator corresponds to the range of hash values assigned to the first division of space and said hash value generator determines to send out said second string of packets over said second output line if said hash value falls within the range of hash values assigned to the second division of said space, and further wherein a ratio between the size of said first division of space and the size of said second division of space is set in accordance with said distribution ratio.

17. The router as recited in claim 16, wherein said hash value is generated based on a combination of information given in the header part of a packet selected from the group consisting of a source address, a destination address, a source port, a destination port, a type of service, and combinations thereof.

18. The router as recited in claim 14, further comprising:
a means for observing the bandwidth used for said second string of incoming packets and determining said distribution ratio depending on the variation of the bandwidth used for said second string of incoming packets.

19. The router as recited in claim 18, wherein said means for observing the bandwidth used for said second string of incoming packets comprises:
a first counter for counting the number of packets queued in said second queue and the number of bytes thereof as well as the number of packets discarded without being queued in said second queue and the number of bytes thereof; and
a second counter for counting the number of packets queued in said fourth queue and the number of bytes thereof as well as the number of packets discarded without being queued in said fourth queue and the number of bytes thereof.

20. A method of routing packets in a network, comprising the steps of:
sending a high priority string of packets via a first queue over a first output line;
sending a low priority string of packets via a second queue over said first output line and via a third queue over a second output line;
detecting a fault in said first output line;
rerouting said high priority string of packets over said second output line via a fourth queue, wherein packets sent from the first queue and the fourth queue have priority over the packets sent from the second queue and the third queue respectively.

* * * * *